US012614860B2

(12) United States Patent
Mashaal

(10) Patent No.: US 12,614,860 B2
(45) Date of Patent: Apr. 28, 2026

(54) FREIGHT CONTAINER SIDE-MOUNTED ANTENNA

(71) Applicant: ARROWSPOT SYSTEMS LTD., Kfar Hess (IL)

(72) Inventor: Heylal Mashaal, Rosh Haayin (IL)

(73) Assignee: ARROWSPOT SYSTEMS LTD., Kfar Hess (IL)

( * ) Notice: Subject to any disclaimer, the term of this patent is extended or adjusted under 35 U.S.C. 154(b) by 70 days.

(21) Appl. No.: 18/853,419

(22) PCT Filed: Apr. 4, 2023

(86) PCT No.: PCT/IL2023/050374
§ 371 (c)(1),
(2) Date: Oct. 2, 2024

(87) PCT Pub. No.: WO2023/195010
PCT Pub. Date: Oct. 12, 2023

(65) Prior Publication Data

US 2025/0219298 A1 Jul. 3, 2025

Related U.S. Application Data

(60) Provisional application No. 63/327,062, filed on Apr. 4, 2022.

(51) Int. Cl.
*H01Q 21/06* (2006.01)
*H01Q 1/12* (2006.01)
*H01Q 21/00* (2006.01)

(52) U.S. Cl.
CPC ......... *H01Q 21/061* (2013.01); *H01Q 1/1221* (2013.01); *H01Q 21/0075* (2013.01)

(58) Field of Classification Search
None
See application file for complete search history.

(56) References Cited

U.S. PATENT DOCUMENTS 10,694,399 B1 * 6/2020 Tran ......................... G06N 3/08
12,133,210 B2 * 10/2024 Pham ................ H04W 72/0473
(Continued)

FOREIGN PATENT DOCUMENTS

CN 113839179 A 12/2021
EP 2511982 A2 10/2012

OTHER PUBLICATIONS

Zhou, Hengyi, et al. "A four-arm circularly polarized high-gain high-tilt beam curl antenna for beam steering applications." IEEE Antennas and Wireless Propagation Letters 17.6 (2018): 1034-103 Apr. 27, 2018-Apr. 27, 2018 (Apr. 27, 2018) pp. 1-5 (5 pages).
(Continued)

*Primary Examiner* — Wilson Lee
(74) *Attorney, Agent, or Firm* — NKL Law; Jae Youn Kim

(57) ABSTRACT

An antenna is provided for satellite communication configured to be mounted in horizontal corrugated recesses of freight container doors. The antenna case has a front side whose vertical dimension is less than or equal to a front recess gap size of 14.5 cm, tapering to a back side vertical dimension of less than or equal to a back recess length of 7 cm, and a case depth of less than or equal to a recess depth of 3.3 cm. The antenna includes a patch layer and a transmission line layer, wherein the patch layer comprises a 2×2 patch layout, giving antenna gain greater than 0 dBi for 0 to 60 degrees above the horizon.

12 Claims, 12 Drawing Sheets

(56) References Cited

U.S. PATENT DOCUMENTS

| | | | | |
|---|---|---|---|---|
| 2014/0070943 | A1* | 3/2014 | Breed | B60R 21/01554 340/539.22 |
| 2019/0013566 | A1* | 1/2019 | Merrell | H01Q 1/1257 |
| 2019/0393930 | A1* | 12/2019 | Wahlberg | H01Q 1/273 |
| 2024/0305018 | A1* | 9/2024 | Chin | H01Q 3/34 |
| 2025/0133382 | A1* | 4/2025 | Li | H04W 4/12 |

OTHER PUBLICATIONS

Hussine, Umniyyah Ulfa. Circularly Polarized Antennas for GNSS Applications. The University of Liverpool (United Kingdom), 2021. Jan. 31, 2021 (Jan. 31, 2021) pp. 2-13 (14 pages).

Kang, Sang-Won, Eun-Kyu Lee, and Tae-Soon Chang. "Design of a location?tracking antenna for transport containers." Microwave and Optical Technology Letters 57.2 (2015): pp. 310-314. Feb. 28, 2015 (Feb. 28, 2015) 5 pages.

Abbak, Mehmet. Microstrip patch antenna array for coverage and range extension of RFID applications. Diss. 2008., Jan. 31, 2008 (Jan. 31, 2008) 83 pages.

* cited by examiner

A
B
24
28C
28D
24
40
30
28B
28A 30
28A
39
38
37
36
35
34
33
32
31

TYPE A RECESS

TYPE A RECESS

TYPE B RECESS

TYPE B RECESS

TRANSMISSION LINE LAYER

FREIGHT CONTAINER SIDE-MOUNTED ANTENNA

FIELD OF THE INVENTION

The present invention relates to the field of satellite antennas and particularly to the application of satellite communication for asset tracking.

BACKGROUND

More than a billion tons of goods are transported in freight containers each year, over both land and sea. Increasingly, operators who provide freight container transport, as well as their customers, are interested in tracking their valuable assets when in transit.

Many methods of tracking include the use of satellite communications, both for ocean freight and for multimodal transport. To support such communications, satellite communication antennas are often mounted on the roofs of containers, giving them a wide view of the sky for transmission and reception. An example of such a configuration is described in U.S. Pat. No. 10,118,576 to Breed, "Shipping container information recordation techniques," which indicates a roof-mounted satellite system for transmitting location and other sensor data. Similarly, the Satellite Data Modem (SDM) from Omnitracs™ is a roof-mounted antenna for tracking assets. The SDM is typically mounted on a freight truck cabin roof.

U.S. Pat. No. 7,965,181 to Rana et al., describes having multiple antennas mounted on multiple respective sides of a freight container. A signal combiner/selector is configured to use the antenna that has the strongest received signal. In another scenario, signal combiner/selector can be configured to combine the signals received from the multiple antennas to produce a more reliable signal. The Next4™ sensor and tracker by Traxens™ has an integrated antenna that is designed to fit onto an edge of a freight container door, remaining in place when the door is shut.

SUMMARY

Embodiments of the present invention provide an antenna device and methods for satellite communications. The antenna device, also referred to herein as a container side-mounted antenna, is configured to be mounted on freight container sides. The antenna device may include one or more printed circuit boards (PCBs), including a patch layer having a 2×2 patch layout and a transmission line layer with striplines configured to set an upward beam steering direction. In some embodiments, the upward beam steering is at least 30 degrees above the horizon. The striplines are further configured to provide circular polarization of transmission. The patch layer and transmission line layer provide an antenna gain greater than 0 dBi for 0 to 60 degrees above the horizon, in an uplink range of at least 1525-1559 MHz, and in a downlink range of at least 1626-1661 MHz. The case depth may be designed to be less than or equal to a door recess depth of 33 mm. In some embodiments, the spacing between patch centers is 54 mm (+/−10%), The patch layer is on an FR-4 dielectric substrate, and the FR-4 dielectric substrate typically has a thickness of 0.6 cm+/−10%.

In some embodiments, the device thickness may be set to 30-32 mm.

The case may be tapered, from front to back, and may include a first taper, conforming to a narrow recess taper, and a second taper, conforming to a wider recess taper, of respective first and second types of corrugated door recess.

Typically, the case perimeter has at least two mounting holes at each horizontal end.

The PCB may include a component layer, on which a modem may be mounted. The modem may be configured to generate data transmissions, which are transmitted from the patch layer, and to receive data transmissions received from the patch layer.

Each patch may have square dimensions. Such dimensions may be 42 mm (+/−10%).

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In order to facilitate better access for mounting and maintenance, as well as to ensure better protection from possible damage, the present invention provides a "container side-mounted antenna," which is designed for communications with low-Earth orbit (LEO) satellites when the antenna is positioned on a container door. As described further hereinbelow, the configuration of the present invention provides better gain and better angular beam range than known antennas.

Figure 1:
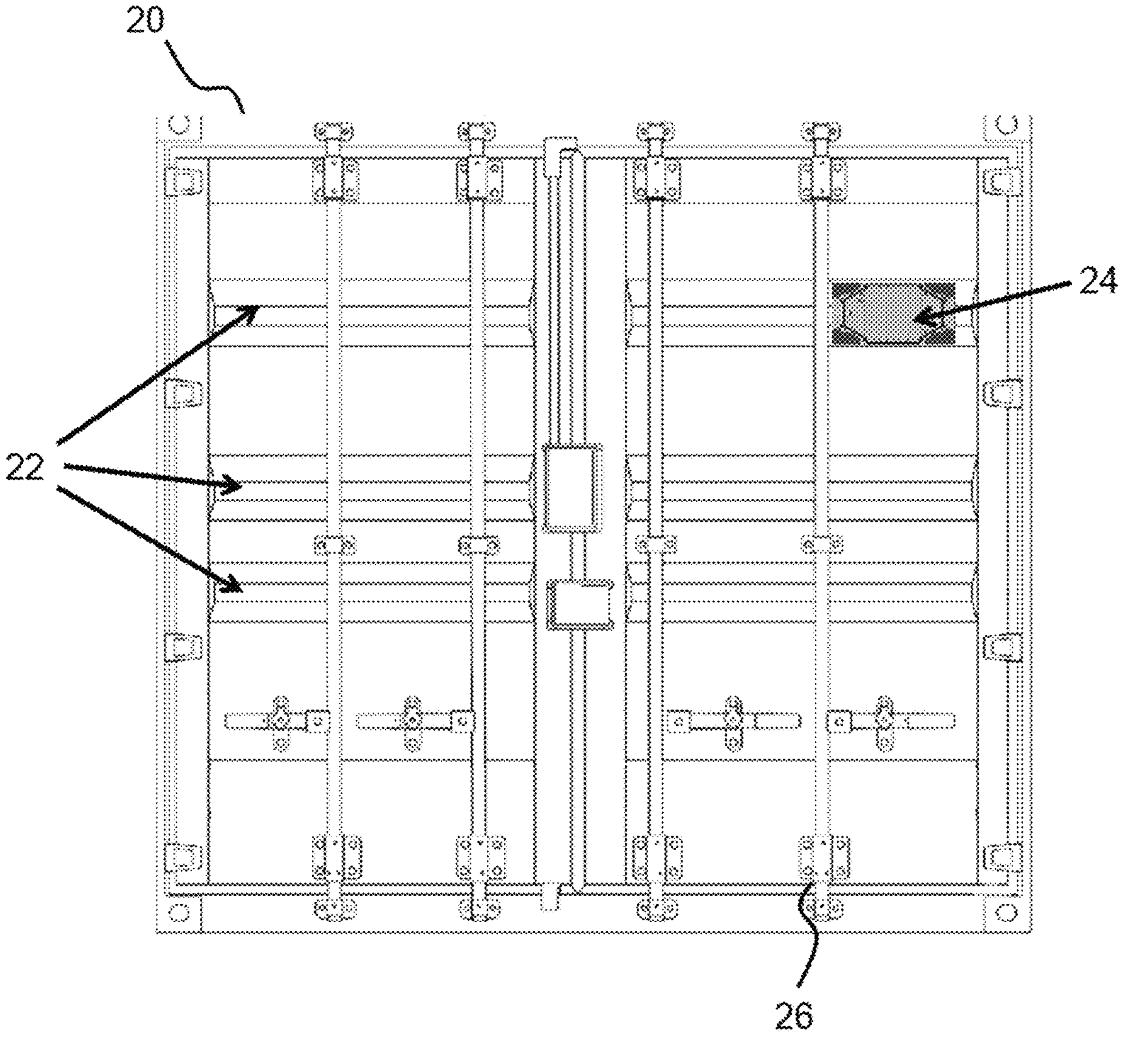
FIG. 1 is a view of a corrugated container door, having a container side-mounted antenna mounted in a corrugated recess of the door, according to some embodiments of the invention.
Figure 2:
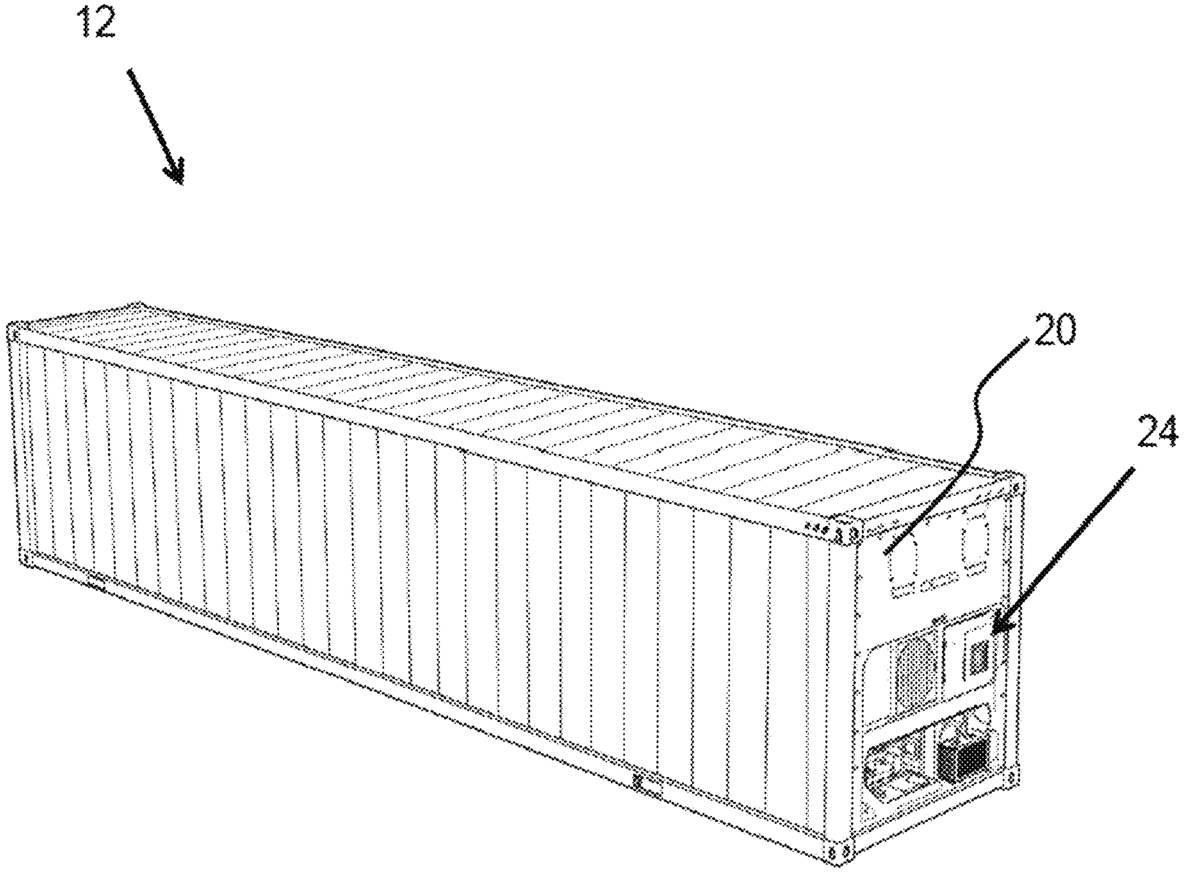
FIG. 2 is a view of a non-corrugated container, having a container side-mounted antenna mounted on an unobstructed surface at the back of the container, according to some embodiments of the invention.

FIG. 1 is a view of a typical freight container door 10 of a freight container used for multimodal transport, i.e., for transport by both ships and trucks. A wide range of container door types are in use for freight containers. Two common door types both have horizontal corrugation, with corrugated recesses 22, as indicated in FIG. 1. A third type of container, a refrigerator container, or "reefer," typically has sides with no corrugation, as shown in FIG. 2.

The present invention provides a container side-mounted antenna 24, which may be positioned as shown in FIG. 1, mounted in any of the corrugated recesses 22 of a container corrugated door 10. Similarly, container side-mounted antenna 24 may be mounted on a non-corrugated back side 20 of a container 12, as shown in FIG. 2. Whether mounted on a corrugated or non-corrugated surface, on any of the sides of a freight container, the low profile of the container side-mounted antenna 24 protects the antenna from damage while providing reliable satellite communications.

FIGS. 3-7 are schematic views of the container side-mounted antenna 24 configured with a tapered back for installation in a corrugated door recess. As shown in FIG. 3A, the side dimensions of the container side-mounted antenna 24 may be designed to fit into either of the two main types of corrugated recesses prevalent in the industry, indicated respectively as types A and B. Both types of recesses have a wide front gap that tapers to a narrower back section. Of the two types, type A has a wider front gap, a shallower depth, and a narrower back section. The dimensions of the two types are described further hereinbelow with respect to FIGS. 4-7.

Figures 3A, 3B, 3C:
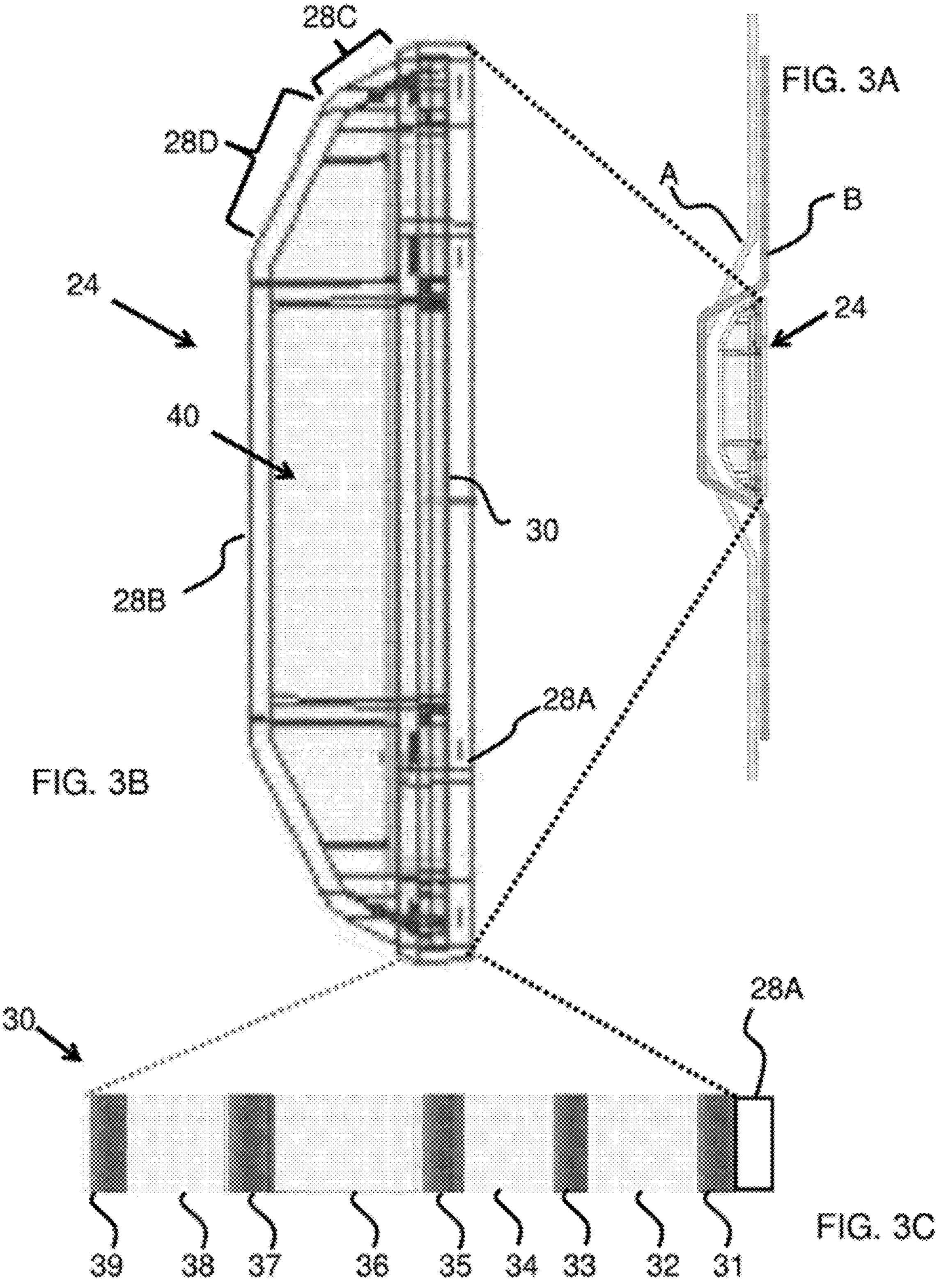
FIGS. 3A-3C are schematic side views of the container side-mounted antenna, according to some embodiments of the invention.

FIG. 3B shows an enlarged view of the container side-mounted antenna 24 in a side horizontal view, that is, from the side of the antenna when the antenna is configured to be mounted in a horizontal corrugated recess of a container door. The antenna has a case with sides of the case indicated as case sections 28A-28D. The case front is indicated as section 28A, and the case back is indicated as section 28B. As shown, the case tapers from the front side to the back side, with the tapering achieved by two separate taper sections 28C and 28D. The longer taper of section 28D conforms to the taper of door recess type A, and the shorter taper of section 28C conforms to the taper of the type B corrugated recess. Consequently, the antenna can fit securely in either type A or type B types of recesses.

FIG. 3C indicates layers of one or more printed circuit boards (PCBs) 30 that are included in the case of the container side-mounted antenna 24. In some embodiments, there are nine PCB layers, including substrates, indicated as layers 31-39. The PCB layers may be produced as a single PCB or produced as two or more separate PCBs that are joined (i.e., "sandwiched" together). In one embodiment, two layers, an antenna patch layer 31 and its substrate layer 32, are manufactured as a single PCB, with the remaining layers as a second PCB.

The layer closest to the front side 28A of the case is the antenna patch layer 31, on which an antenna patch configuration is manufactured as described further hereinbelow with respect to FIG. 8.

The next layer, a patch substrate layer 32, provides a dielectric layer between the antenna patch layer 31 and a ground layer 33. The dielectric substrate, in an exemplary embodiment, is an FR4 material. The FR4 substrate has a dielectric constant of ~4.2, and the results described below for the antenna performance are based on a thickness of 0.6 cm (+/−10%) for the FR4 substrate. A range of other materials may be applied with the layer thickness modified according. However, such modifications, such as use of alumina with a dielectric constant of ~9.6, may also require modification of components on the component layer described below, in order to maintain the overall case size described below.

Behind the ground layer 33, is a second substrate layer 34. Under this substrate layer is a feed network or transmission line layer 35 that includes buried striplines. Buried striplines, as opposed to an external microstrip layer, provide a clear external layer available for component placement and routing. In alternative embodiments, the transmission line layer 35 may be implemented as an external layer with microstrips in place of striplines, and the term "stripline" is to be understood to refer herein to either striplines or to microstrips.

The transmission line layer is on third substrate layer 36 under which is a second ground layer 37. A fourth substrate layer 38 then provides a base for a components layer 39, that is, a layer on which components are placed. Additional layers, not shown, may also be provided for routing of component traces. The components layer typically includes a modem and other standard transceiver components. In some embodiments, the antenna can work in either of two modes, in a mode of communications with an L-band, LEO satellite network, or as a GPS receiver. A controller on the components layer may switch between drivers for the two alternative modes. A battery may also be installed in the case in space 40 behind the PCB to power the components. In alternative configurations, the antenna 24 is configured without the modem, controller, and/or battery, in which case these components are positioned in proximity to the antenna 24. The antenna case may also be configured to hold only the PCB layers 30, without having a tapered back that includes the space 40. Such a case design is particularly appropriate for mounting on non-corrugated container doors.

If the multiple layers are manufactured as a single PCB, vias in the PCB connect the patches to the appropriate locations of the striplines, and the striplines are in turn connected by vias to the electronic components, i.e., the modem components described above, on the components layer. If multiple PCBs are sandwiched together, soldered pins may be used instead of vias.

Figure 4A:
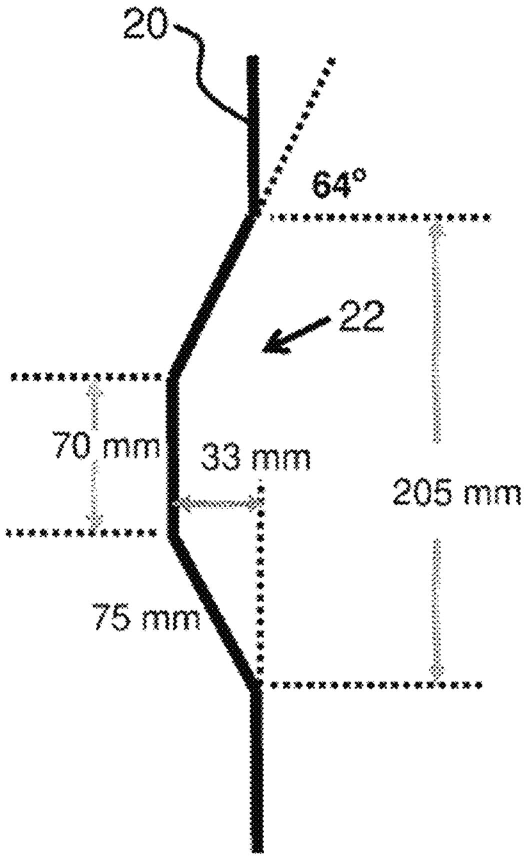
FIGS. 4A and 4B are side views of a first type of corrugated door cavity or "recess" that is prevalent in the industry, with a container side-mounted antenna mounted in the recess shown in FIG. 3B, according to some embodiments of the invention.
Figure 4B:
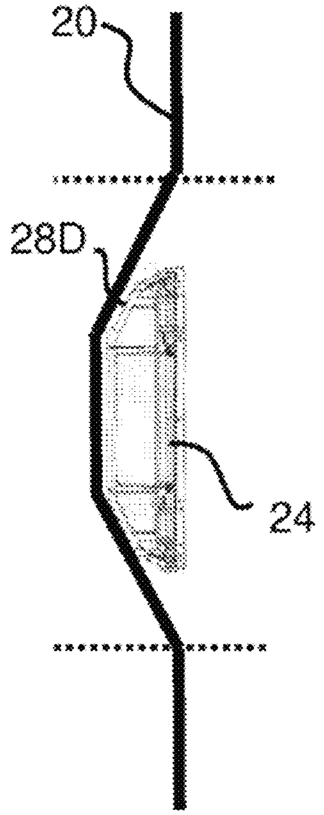

FIGS. 4A and 4B are side views of the corrugated door 10, showing a corrugated cavity or recess 22, referred to herein as a type A recess. Dimensions of the recess are indicated in FIG. 3A. The front gap is about 205 mm, the back section is about 70 mm, and the depth of the recess is about 33 mm, all measurements being with the tolerances of corrugated container manufacturing. As indicated in FIG. 3B, section 28D of the antenna case rests against the tapered section of the type A recess. The thickness of the antenna case is typically designed to be less than or equal to the 33 mm depth of the type A recess, which is shallower than the type B. For example, the antenna case thickness may be 30-32 mm.

Figure 5A:
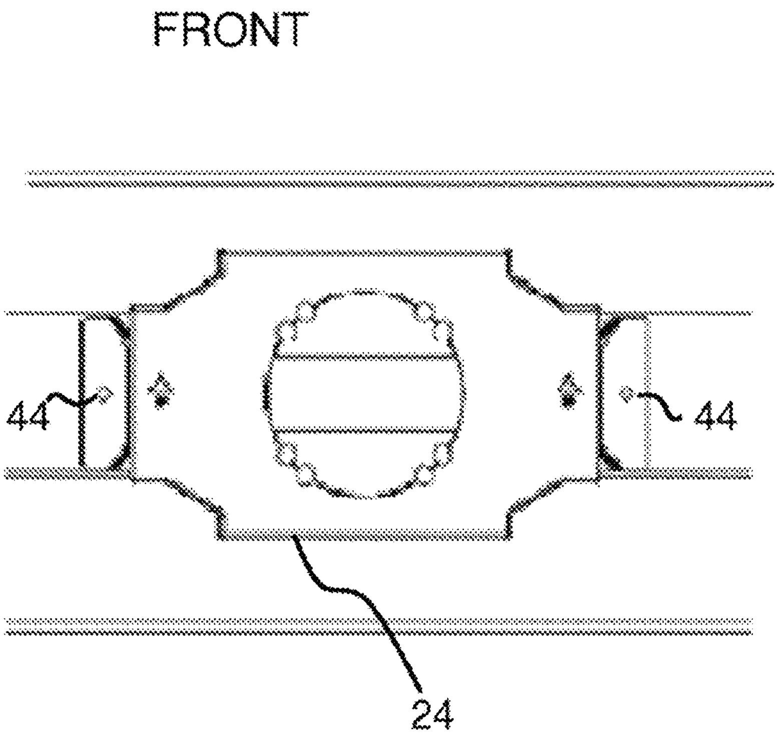
FIGS. 5A and 5B are front and side views, respectively, of a container side-mounted antenna mounted in the first type of corrugated door recess, according to some embodiments of the invention.
Figure 5B:
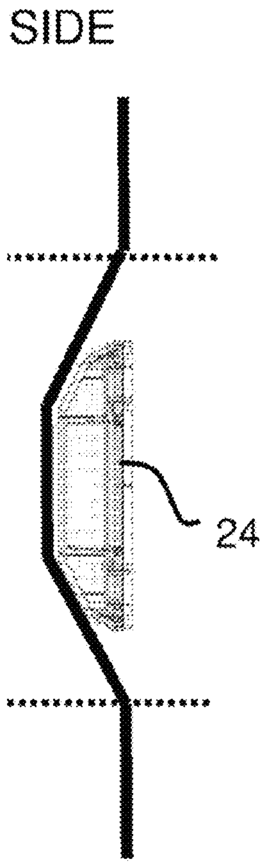

FIGS. 5A and 5B are front and side views, respectively, of the container side-mounted antenna 24, mounted in the type A corrugated door recess. Mounting holes 44 at the sides of the antenna case permit firm temporary or permanent installation. Additional mounting holes around the case perimeter, as well as additional means of mounting, not shown, may also be applied.

Figure 6A:
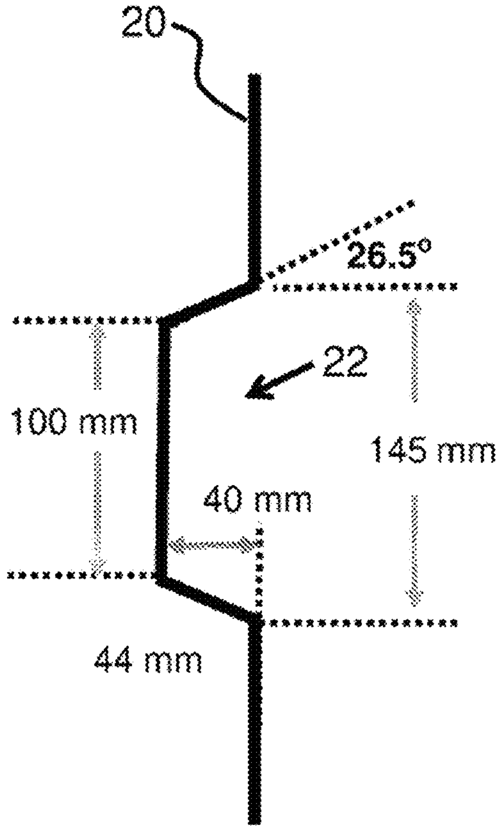
FIGS. 6A and 6B are side views of a second type of corrugated door recess, with a container side-mounted antenna indicated in FIG. 5B, according to some embodiments of the invention.
Figure 6B:
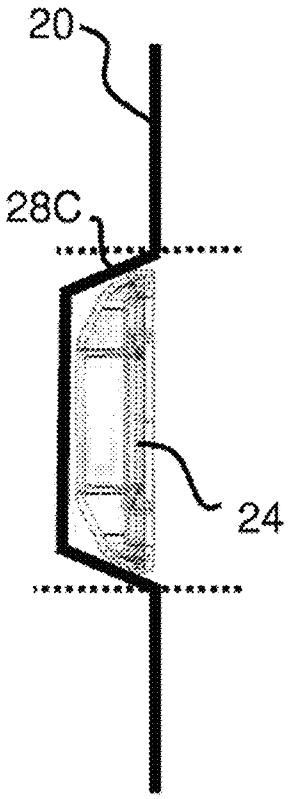

FIGS. 6A and 6B are side views of the corrugated door 10, showing a corrugated cavity or recess 22, referred to herein as a type B recess. Dimensions of the recess are indicated in FIG. 6A. The front gap is about 145 mm, the back section is about 70 mm, and the depth of the recess is about 40 mm, all measurements being with the tolerances of corrugated container manufacturing. As indicated in FIG. 3B, section 28C of the antenna case rests against the tapered section of the type B recess.

Figure 7A:
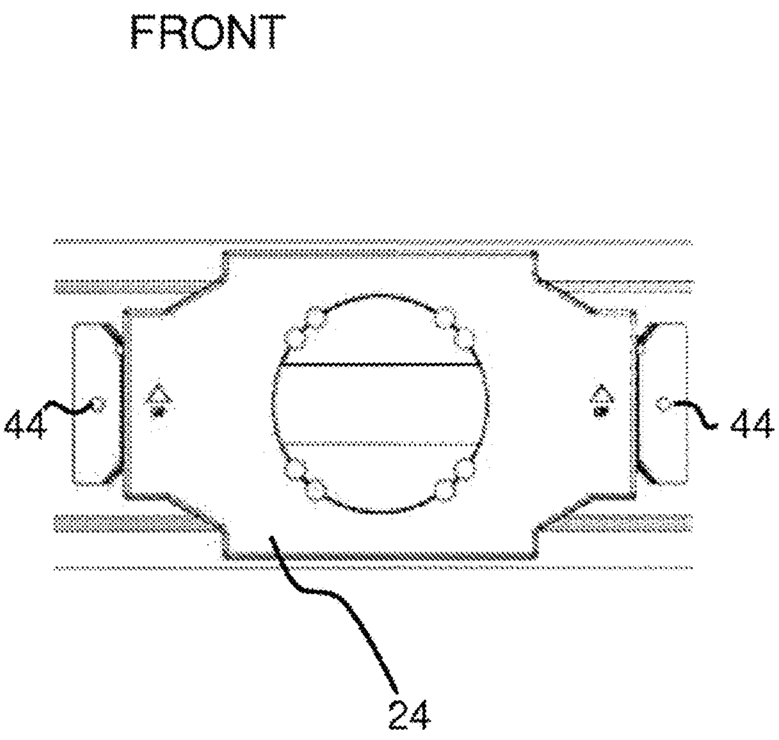
FIGS. 7A and 7B are front and side views, respectively, of a container side-mounted antenna, mounted in the second type of corrugated door recess, according to some embodiments of the invention.
Figure 7B:
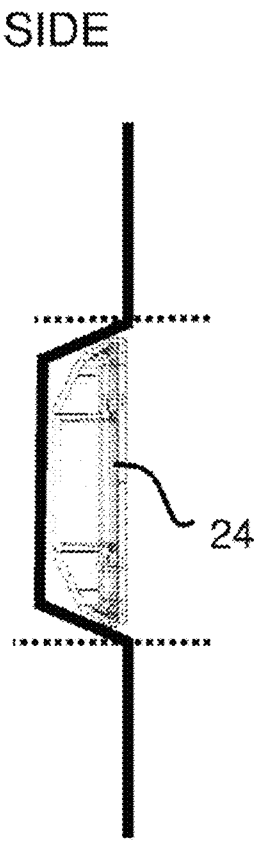

FIGS. 7A and 7B are front and side views, respectively, of the container side-mounted antenna 24, mounted in the type B corrugated door recess. Mounting holes 44 to the sides of the container side-mounted antenna permit firm installation, as described above, with additional mounting holes and alternative methods possible.

Figure 8:
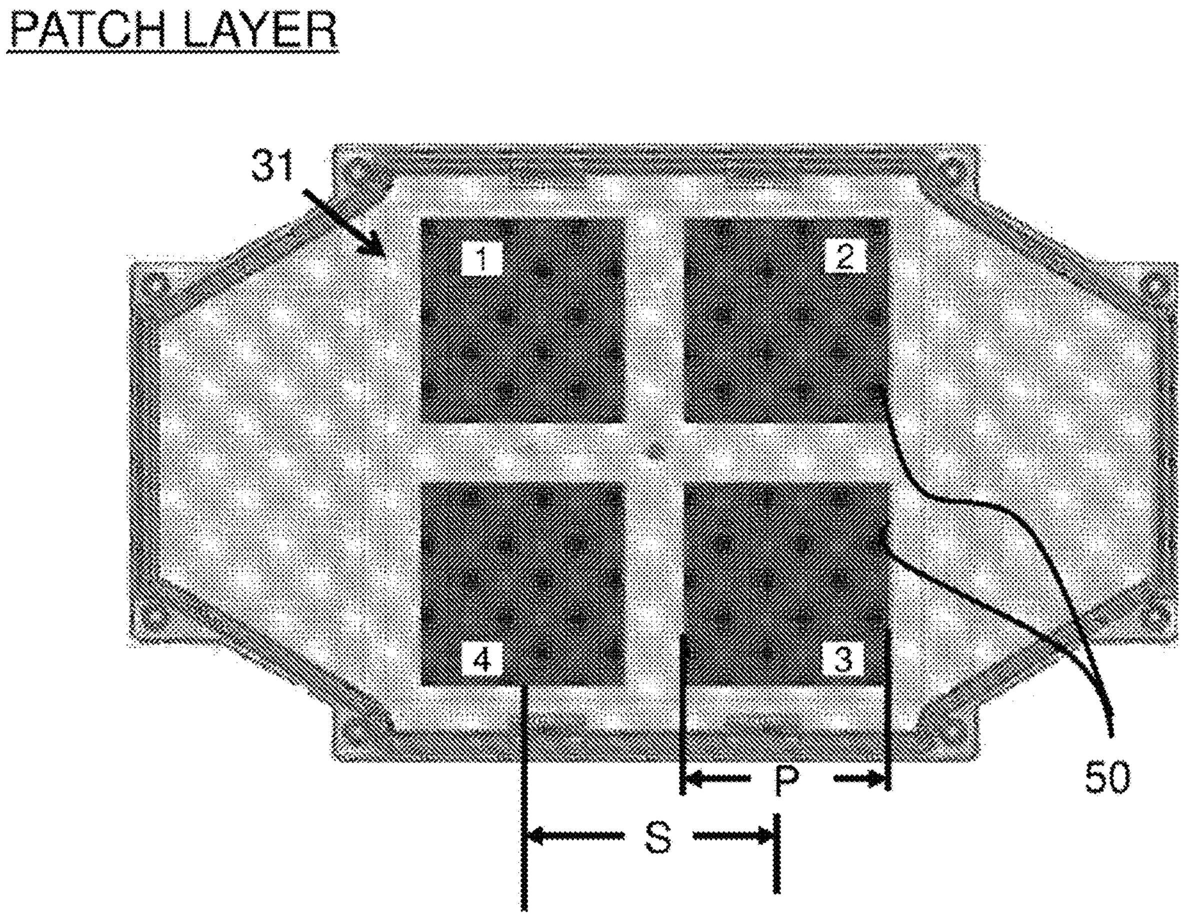
FIG. 8 is a cut-away, front view of a patch layer of the container side-mounted antenna, according to some embodiments of the invention.

FIG. 8 is a cut-away, front view of a patch layer 31 of the container side-mounted antenna 24. The patch layer has four patches 50, in a 2×2 layout. Spacing S between patch centers in the exemplary design shown is 54 mm (+/−10%). The patch is roughly 0.5 times the effective wavelength (taking into account the dielectric substrate). In one embodiment, each patch 50 has square dimensions P of 42 mm (+/−10%). Alternatively, patches can have different shapes: rectangular, circular, annular, hexagonal, etc. Testing of several layouts showed that the 2×2 layout provides greater left-right beam symmetry than a 2×1 layout, and is therefore preferable.

Figure 12:
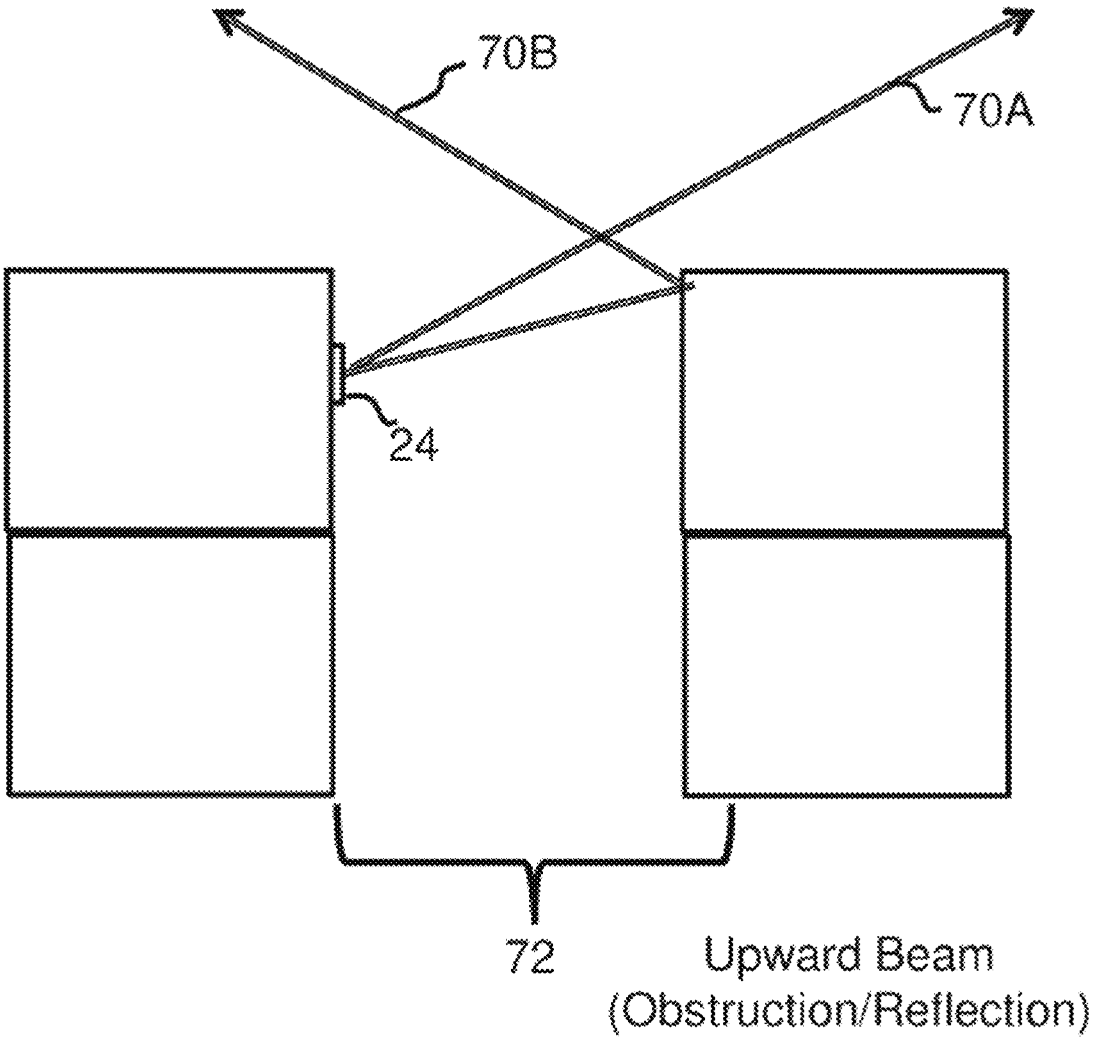
FIG. 12 is a schematic diagram of reflected radiation to and from the container side-mounted antenna mounted on a stacked container, according to some embodiments of the invention.

The container side-mounted antenna of the present invention is designed to have an upward pointing beam, such that a portion of the sky is within the beam range, or is accessible by reflection when there is an obstruction, as indicated in FIG. 12. The upward beam steering is achieved by the combined design of the patch and transmission line layers. The upward beam improves reliability of communications from a freight container to a satellite, during transport by both truck and ship, as well as for periods of port or depot storage. An upward beam also helps overcome the interference caused by close stacking of containers, as indicated in FIG. 12.

Figure 9:
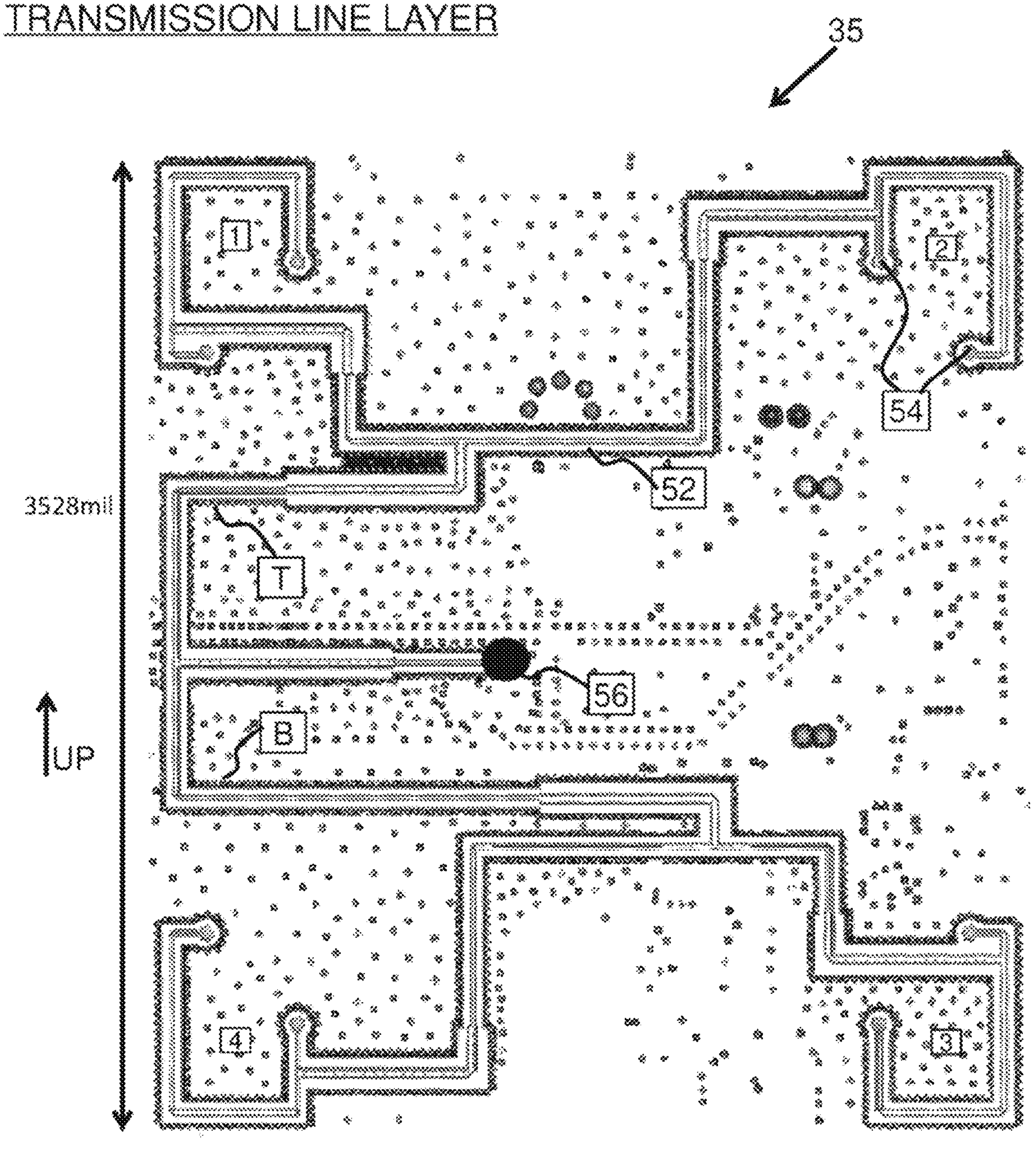
FIG. 9 is a cut-away, front view of a transmission line layer of the container side-mounted antenna, according to some embodiments of the invention.

Striplines 52 of the transmission line layer 35, as shown in FIG. 9, are configured to set a beam steering direction of at least 30 degrees above the horizon, and circular polarization of transmission. Stripline length differences between the top and bottom pairs of patches creates the beam tilt in the elevation axis. In the exemplary design shown, the stripline length difference to achieve the beam tilt is indicated as the difference between the bottom arm B and the top arm T, and is approximately 20 mm. The stripline lengths were set based on a target radiation frequency of 1.6 GHz, and a quarter wavelength transmission length in the stripline of approximately 23 mm.

Feed points 54 from the striplines to each of the patches 1-4 are sequentially rotated, that is, each patch is a clone of its adjacent clockwise neighbor with a 90 degree rotation relative to its center, to create a symmetric array feed and, as a result, a more symmetric, circularly polarized radiation pattern. The stripline feed network is an equal-power combining network that combines all patch feed lines to a single stripline output that is connected to a radio frequency (RF) front-end (i.e., the amplifiers, switches, matching networks, etc. between the feed lines and the modem). The stripline combining feed network also equates the phase differences between the patches, which emanate from the sequential rotation of the patches, which also adds 90 degree sequential phase shifts.

A modem connection point 56 is also indicated in the figure. A modem may be configured either internally to the antenna device, as described above, or externally.

Figure 10:
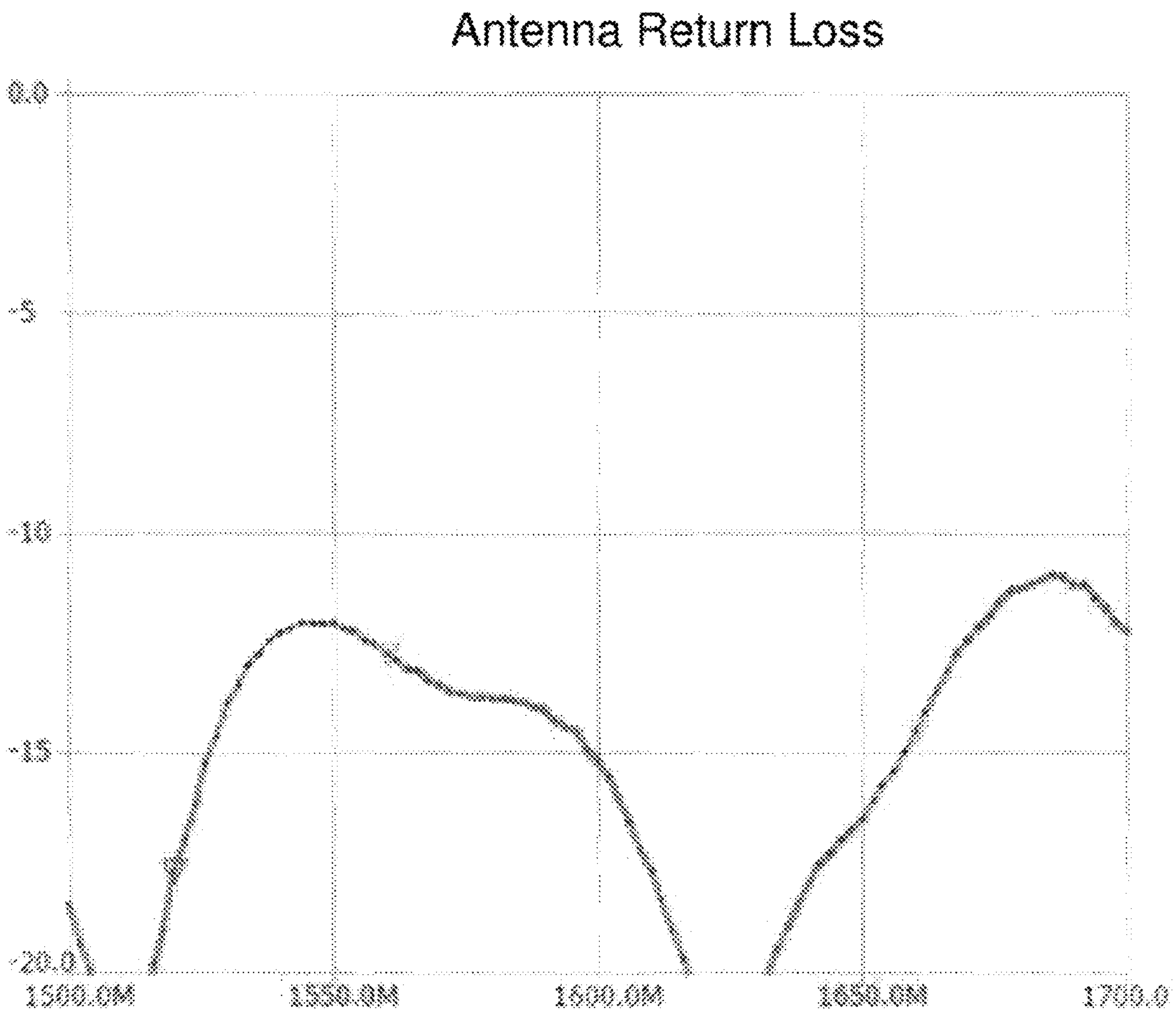
FIG. 10 is a graph of antenna return loss of the container side-mounted antenna, according to some embodiments of the invention.
Figure 11:
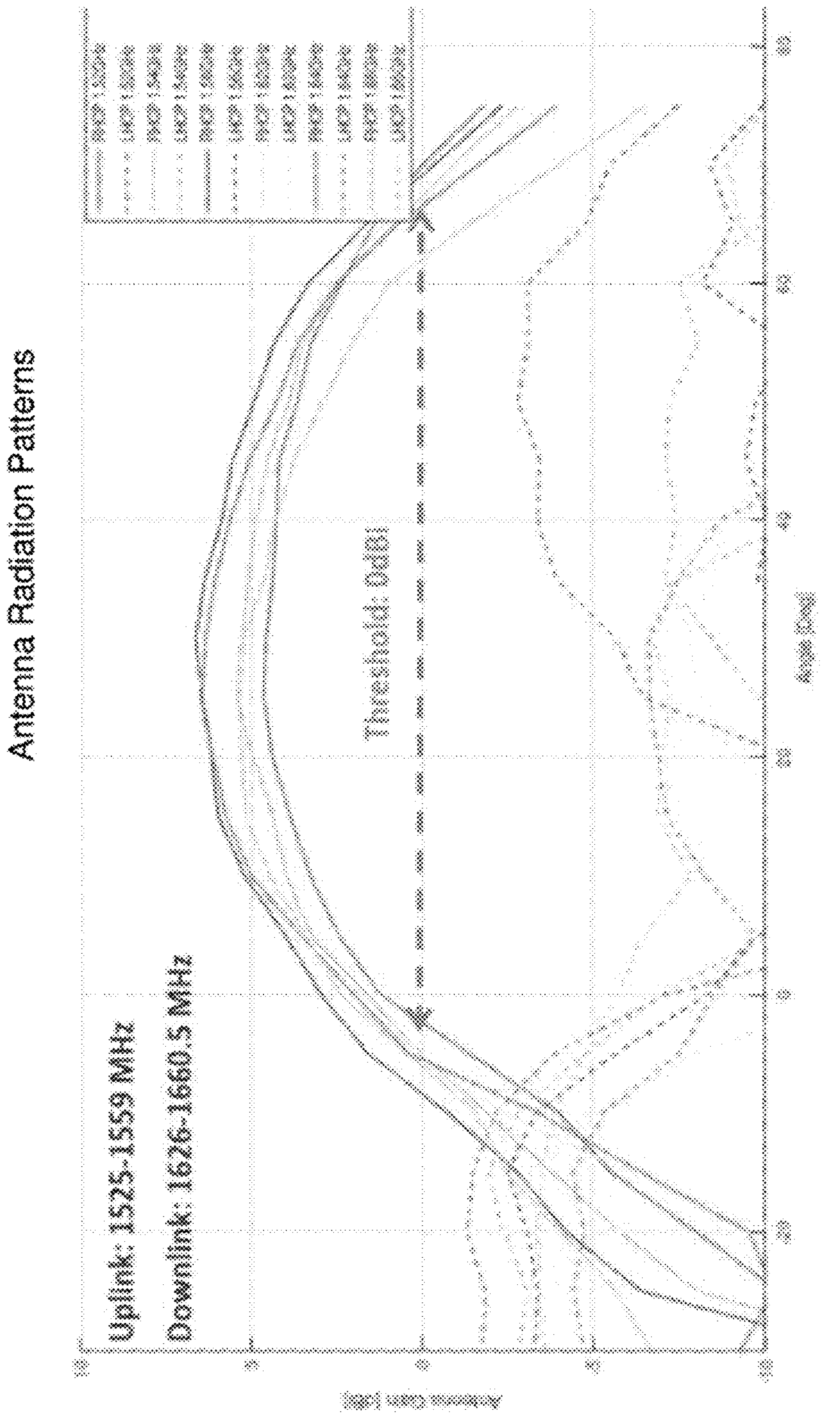
FIG. 11 is a graph of radiation patterns of the container side-mounted antenna, according to some embodiments of the invention.

As shown in the graph of FIG. 10, the patch configuration provides broadband impedance matching with return loss better than −12 dB over the 1500-1700 MHz range, thereby supporting a design satellite uplink range of 1525-1559 MHZ, and a downlink range of 1626-1661 MHz. FIG. 11 shows that the antenna gain is greater than 0 dBi for at least 0 to 60 degrees above the horizon, for all relevant uplink and downlink frequencies. FIG. 11 also shows that, for the transmission line configured to provide RHCP, the cross-polarization difference between the RHCP and LHCP gains are generally better than 10 dB throughout the target range.

FIG. 12 is a schematic diagram of the upward radiating beam from the container side-mounted antenna 24, when the antenna is mounted on a container positioned among a set of stacked containers 72, which create an obstruction. As indicated, a first portion of the radiation, indicated as beam 70A, avoids the obstruction, while a second portion, indicated as beam 70B, is reflected upwards in order to achieve satellite communications.

While the invention has been described with respect to a limited number of embodiments, these should not be construed as limitations on the scope of the invention, but rather as exemplifications of some of the preferred embodiments as defined by the claims. That is, the scope of the present invention includes variations and modifications thereof which would occur to persons skilled in the art upon reading the foregoing description and which are not disclosed in the prior art.

The invention claimed is:

1. An antenna device for satellite communications configured to be mounted on freight container doors, the antenna device comprising:

a case, mountable horizontally to a container side; and one or more printed circuit board (PCB) layers set in the case, comprising a patch layer and a transmission line layer, wherein the patch layer comprises a 2×2 patch layout, and wherein striplines of the transmission line layer are configured to set an upward beam steering direction, with circular polarization of transmission, giving an antenna gain greater than 0 dBi for 0 to 60 degrees above the horizon, in an uplink range of at least 1525-1559 MHz, and in a downlink range of at least 1626-1661 MHz.

2. The antenna device of claim 1, wherein the upward beam steering direction is at least 30 degrees above the horizon.

3. The antenna device of claim 2, wherein the patch layer is on a FR-4 dielectric substrate having a thickness of 0.6 cm+/−10%.

4. The antenna device of claim 1, wherein the antenna device has a thickness of less than or equal to a corrugated door recess depth of 33 mm.

5. The antenna device of claim 1, wherein the case has a front side whose vertical dimension is less than or equal to a front recess gap size of 145 mm.

6. The antenna device of claim 1, wherein the case has a front side tapering to a back side vertical dimension of less than or equal to a back recess length of 70 mm.

7. The antenna device of claim 1, wherein the case depth is less than or equal to a recess depth of 33 mm.

8. The antenna device of claim 1, wherein vertical spacing between patch centers is less than 6 cm.

9. The antenna device of claim 1, wherein case tapering from front to back comprises a first taper conforming to a narrow recess taper of a first type of corrugated door recess, and a second taper conforming to a wider recess taper of a second type of corrugated door recess.

10. The antenna device of claim 1, wherein the case perimeter has at least two mounting holes at each horizontal end.

11. The antenna device of claim 1, wherein the PCB layers further comprise a component layer, wherein the component layer comprises a modem configured to generate data transmissions, which are transmitted from the patch layer, and to receive data transmissions received from the patch layer.

12. The antenna device of claim 1, each patch having square dimensions of 42 mm (+/−10%).

* * * * *